(12) United States Patent
Brown et al.

(10) Patent No.: US 8,434,075 B1
(45) Date of Patent: Apr. 30, 2013

(54) BRANCHING OPTIMIZATION IN A MULTI-DATABASE SYSTEM

(75) Inventors: Douglas P. Brown, Rancho Santa Fe, CA (US); John Mark Morris, San Diego, CA (US)

(73) Assignee: Teradata US, Inc., Dayton, OH (US)

( * ) Notice: Subject to any disclaimer, the term of this patent is extended or adjusted under 35 U.S.C. 154(b) by 392 days.

(21) Appl. No.: 12/423,885

(22) Filed: Apr. 15, 2009

(51) Int. Cl.
*G06F 9/45* (2006.01)
*G06F 9/44* (2006.01)
*G06F 17/30* (2006.01)

(52) U.S. Cl.
USPC ........... 717/151; 717/131; 717/140; 707/713; 707/718

(58) Field of Classification Search ................ 707/713, 707/718
See application file for complete search history.

(56) References Cited

U.S. PATENT DOCUMENTS

| | | | |
|---|---|---|---|
| 6,564,372 B1* | 5/2003 | Babaian et al. | 717/151 |
| 6,847,978 B2* | 1/2005 | Ellis et al. | 707/713 |
| 7,716,215 B2* | 5/2010 | Lohman et al. | 707/721 |
| 7,774,336 B2* | 8/2010 | Beyer et al. | 707/718 |
| 7,913,241 B2* | 3/2011 | Liu et al. | 717/151 |
| 8,065,670 B2* | 11/2011 | Nightingale et al. | 717/151 |
| 8,126,870 B2* | 2/2012 | Chowdhuri et al. | 707/713 |
| 8,156,107 B2* | 4/2012 | Bawa et al. | 707/713 |
| 8,190,598 B2* | 5/2012 | Al-Omari et al. | 707/718 |
| 8,229,923 B2* | 7/2012 | Mirchandani et al. | 707/718 |
| 2002/0120921 A1* | 8/2002 | Coburn et al. | 717/140 |
| 2003/0061244 A1* | 3/2003 | Hirohata | 707/200 |
| 2004/0225639 A1* | 11/2004 | Jakobsson et al. | 707/2 |
| 2006/0020573 A1* | 1/2006 | Galindo-Legaria et al. | 707/1 |
| 2006/0080285 A1* | 4/2006 | Chowdhuri | 707/3 |
| 2006/0136396 A1* | 6/2006 | Brobst | 707/3 |
| 2007/0006169 A1* | 1/2007 | Iliev et al. | 717/131 |
| 2007/0226186 A1* | 9/2007 | Ewen et al. | 707/3 |
| 2007/0226709 A1* | 9/2007 | Coker et al. | 717/140 |
| 2008/0052687 A1* | 2/2008 | Gonzales-Tuchmann et al. | 717/140 |
| 2008/0127120 A1* | 5/2008 | Kosche et al. | 717/131 |
| 2008/0177722 A1* | 7/2008 | Lohman et al. | 707/4 |
| 2008/0256024 A1* | 10/2008 | Downer et al. | 707/2 |
| 2009/0070313 A1* | 3/2009 | Beyer et al. | 707/5 |
| 2009/0106219 A1* | 4/2009 | Belknap et al. | 707/4 |
| 2009/0327214 A1* | 12/2009 | Richardson et al. | 707/2 |

OTHER PUBLICATIONS

Amol Deshpande, Adaptive Query Processing, Foundations and Trends in Database, 2007, pp. 2-23.*
Daniel S. Weld, An Adaptive Query Execution System for Data Integration, University of Washington, 1999, pp. 2-7.*
Navin Kabra, Efficient Mid-Query Re-Optimization of Sub-Optimal Query Execution Plans, Computer Sciences Department University of Wisconsin, Madison, 1998, pp. 106-113.*

* cited by examiner

*Primary Examiner* — Thuy Dao
*Assistant Examiner* — Mongbao Nguyen
(74) *Attorney, Agent, or Firm* — Howard Speight

(57) ABSTRACT

Execution of a query is optimized. A plurality of plans for executing the query on a multi-database system are analyzed. A first plan having a first step and a second step is selected. The first step of the first plan is executed. The plan selection is re-evaluated before executing the second step of the first plan. A second plan of the plurality of plans for executing the query is executed to produce a result. The result is stored.

18 Claims, 5 Drawing Sheets

BRANCHING OPTIMIZATION IN A MULTI-DATABASE SYSTEM

BACKGROUND

Query execution optimization is used to make the best use of valuable database system resources. Query execution optimization is particularly challenging in a multi-database system.

SUMMARY

In general, in one aspect, the invention features a method for optimizing execution of a query. The method includes analyzing a plurality of plans for executing the query on a multi-database system. The method further includes selecting a first plan having a first step and a second step. The method further includes executing the first step of the first plan. The method further includes re-evaluating the plan selection before executing the second step of the first plan. The method further includes executing a second plan of the plurality of plans for executing the query to produce a result. The method further includes storing the result.

Implementations of the invention may include one or more of the following. Selecting the first plan may include selecting the one of the plurality of plans that has the least cost. The second plan may have a first step and a second step. The first step of the first plan may be the same as the first step of the second plan. The second step of the first plan may not be the same as the second step of the second plan. Executing the second plan may include executing the second step of the second plan. Executing the second plan may include executing the first step of the second plan and the second step of the second plan. The method may further include determining that the first plan is no longer viable, and, in response, selecting the second plan to execute the query. Determining that the first plan is no longer viable may include determining that a system resource necessary to perform the first plan has malfunctioned. Determining that the first plan is no longer viable may include determining that a system resource necessary to perform the first plan has become busy.

In general, in another aspect, the invention features a multi-database system. The system includes one or more nodes. The system further includes a plurality of CPUs, each of the one or more nodes providing access to one or more CPUs. The system further includes a plurality of virtual processes, each of the one or more CPUs providing access to one or more virtual processes. Each virtual process is configured to manage data, including rows from the set of database table rows, stored in one of a plurality of data-storage facilities. The system further includes a process configured to optimize execution of a query. The process analyzes a plurality of plans for executing the query on a multi-database system. The process further selects a first plan having a first step and a second step. The process further executes the first step of the first plan. The process further re-evaluates the plan selection before executing the second step of the first plan. The process further executes a second plan of the plurality of plans for executing the query to produce a result. The process further stores the result.

In general, in another aspect, the invention features a computer program, stored in a computer-readable tangible medium, for optimizing execution of a query. The program includes executable instructions that cause a computer to analyze a plurality of plans for executing the query on a multi-database system. The program further includes executable instructions that cause the computer to select a first plan having a first step and a second step. The program further includes executable instructions that cause the computer to execute the first step of the first plan. The program further includes executable instructions that cause the computer to re-evaluate the plan selection before executing the second step of the first plan. The program further includes executable instructions that cause the computer to execute a second plan of the plurality of plans for executing the query to produce a result. The program further includes executable instructions that cause the computer to store the result.

DETAILED DESCRIPTION

Figure 1:
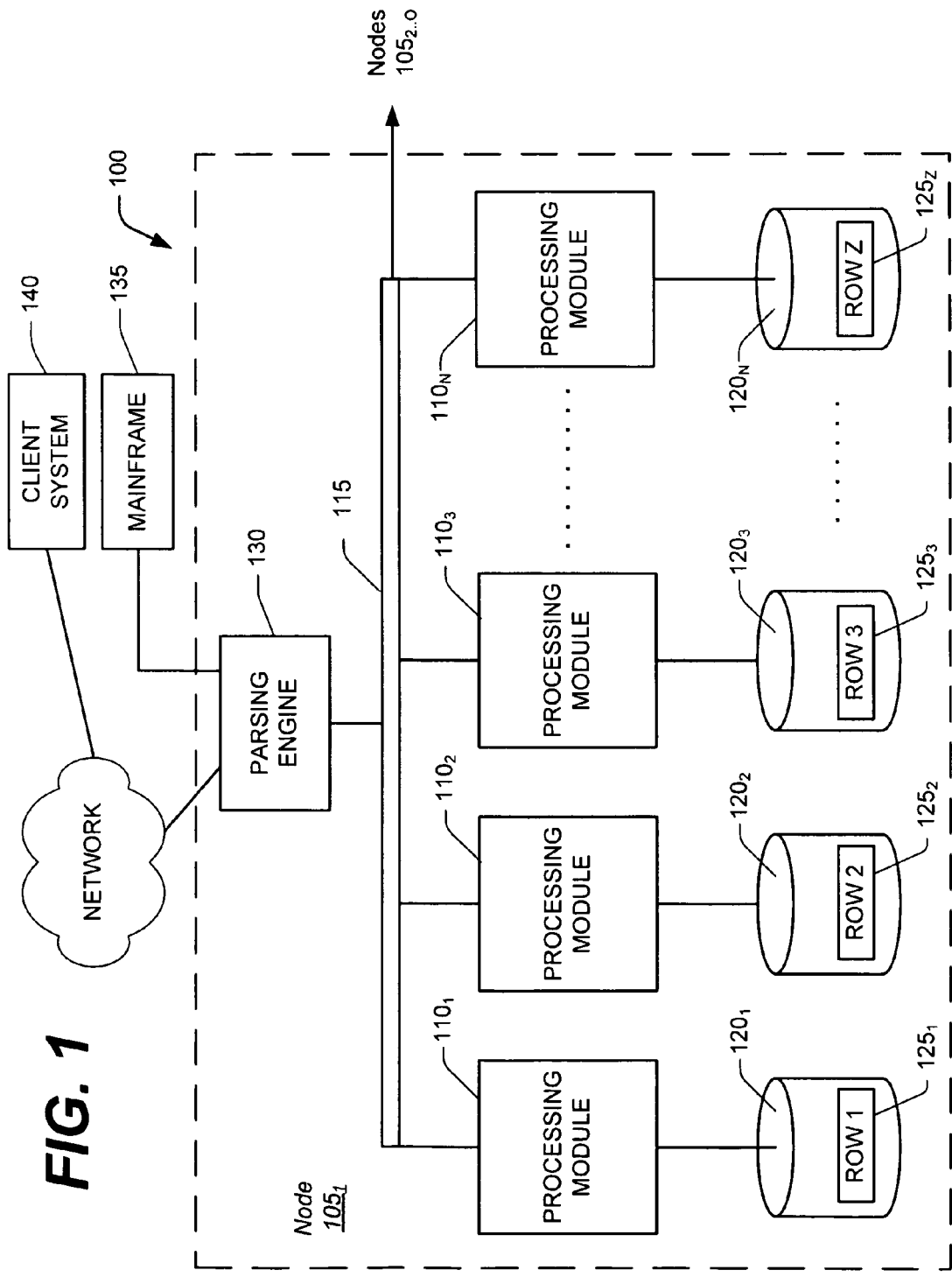
FIG. 1 is a block diagram of a node of a database system.

The optimization technique disclosed herein has particular application, but is not limited, to large databases that might contain many millions or billions of records managed by a database system ("DBS") 100, such as a Teradata Active Data Warehousing System available from the assignee hereof. FIG. 1 shows a sample architecture for one node $105_1$ of the DBS 100. The DBS node $105_1$ includes one or more processing modules $110_{1 \ldots N}$, connected by a network 115, that manage the storage and retrieval of data in data-storage facilities $120_{1 \ldots N}$. Each of the processing modules $110_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1 \ldots N}$ manages a portion of a database that is stored in a corresponding one of the data-storage facilities $120_{1 \ldots N}$. Each of the data-storage facilities $120_{1 \ldots N}$ includes one or more disk drives. The DBS may include multiple nodes $105_{2 \ldots N}$ in addition to the illustrated node $105_1$, connected by extending the network 115.

The system stores data in one or more tables in the data-storage facilities $120_{1 \ldots N}$. The rows $125_{1 \ldots Z}$ of the tables are stored across multiple data-storage facilities $120_{1 \ldots N}$ to ensure that the system workload is distributed evenly across the processing modules $110_{1 \ldots N}$. A parsing engine 130 organizes the storage of data and the distribution of table rows $125_{1 \ldots Z}$ among the processing modules $110_{1 \ldots N}$. The parsing engine 130 also coordinates the retrieval of data from the data-storage facilities $120_{1 \ldots N}$ in response to queries received from a user at a mainframe 135 or a client computer 140. The DBS 100 usually receives queries and commands to build tables in a standard format, such as SQL.

In one implementation, the rows $125_{1...Z}$ are distributed across the data-storage facilities $120_{1...N}$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $120_{1...N}$ and associated processing modules $110_{1...N}$ by a hash bucket map. The characteristics of the columns chosen for the primary index determine how evenly the rows are distributed.

In addition to the physical division of storage among the storage facilities illustrated in FIG. 1, each storage facility is also logically organized. One implementation divides the storage facilities into logical blocks of storage space. Other implementations can divide the available storage space into different units of storage. The logical units of storage can ignore or match the physical divisions of the storage facilities.

Figure 2:
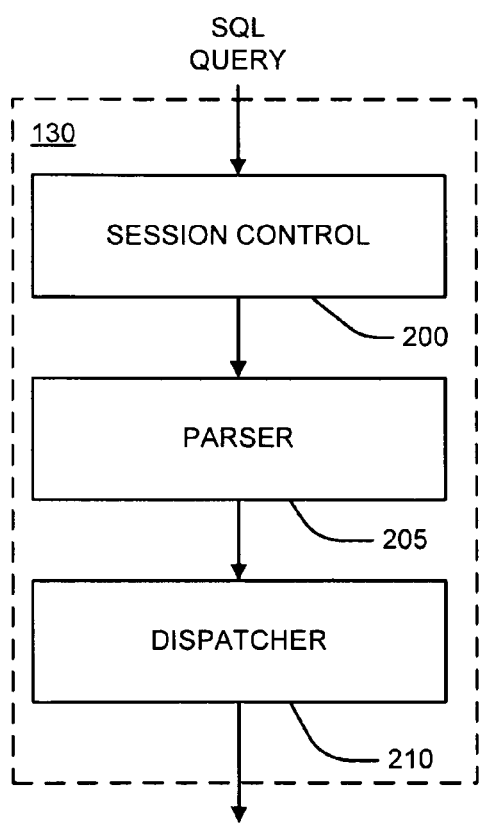
FIG. 2 is a block diagram of a parsing engine.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Figure 3:
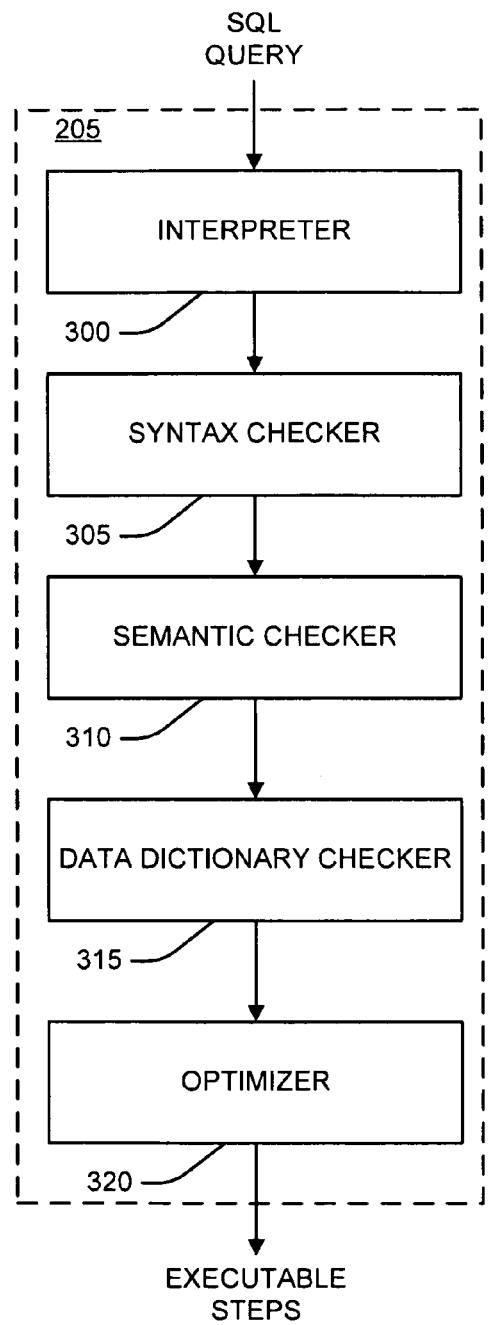
FIG. 3 is a flowchart of a parser.

Once the session control 200 allows a session to begin, a user may submit a SQL query, which is routed to the parser 205. As illustrated in FIG. 3, the parser 205 interprets the SQL query (block 300), checks it for proper SQL syntax (block 305), evaluates it semantically (block 310), and consults a data dictionary to ensure that all of the objects specified in the SQL query actually exist and that the user has the authority to perform the request (block 315). Finally, the parser 205 runs an optimizer (block 320), which develops the least expensive plan to perform the request and produces executable steps to execute the plan. A dispatcher 210 issues commands to the processing modules $110_{1...N}$ to implement the executable steps.

Figure 4:
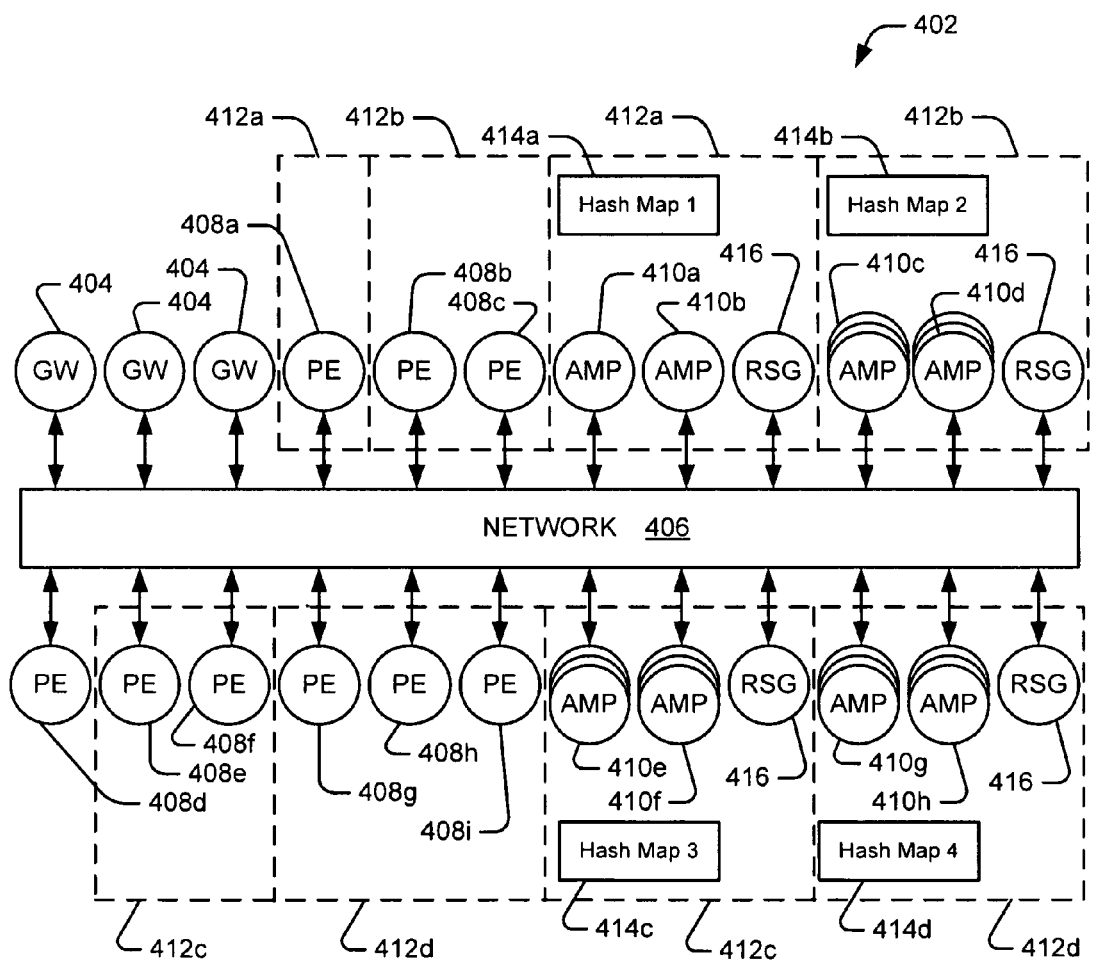
FIG. 4 is a block diagram of a multi-database system.

FIG. 4 illustrates one embodiment of a multi-database system 402 having a plurality of system databases of the type illustrated in FIG. 1. In one embodiment, one or more gateways ("GW") 404 provide an interface from a local area network ("LAN") or other communications network, such as the Internet or a wireless network, to a network 406 that interconnects the components of the multi-database system 402. In one embodiment, the gateways 404 receive messages from a LAN and convert them to a message format used on the network 406. In one embodiment, this entails encapsulating messages received via the LAN in a wrapper appropriate for the network 406.

In one embodiment, the virtual parsing engines ("PE") 408a-i perform the functions of the parsing engine 130 described above. In one embodiment, however, the virtual parsing engines 408a-i are not fixedly assigned to a set of processing modules 110. Instead, the mapping between virtual parsing engines 408a-i and processing modules 110 is variable depending on the current needs of the system. In one embodiment, one of the virtual parsing engines, 408a, serves as a virtual regulator, providing the functions described in co-pending U.S. patent application Ser. No. 11/891,919, entitled "Dynamic Query Optimization Between Systems Based On System Conditions," incorporated by reference, and co-pending U.S. patent application Ser. No. 11/716,889, entitled Virtual Regulator for Multi-Database Systems, filed on Mar. 12, 2007, incorporated by reference.

In one embodiment, Access Module Processors ("AMPs") 410a-h, which are generally equivalent to the processing modules $110_{1...N}$ shown in FIG. 1, are grouped as shown by the dashed boxes 412a-d in FIG. 4. In one embodiment, each group 412a-d is a DBS 100 (or system database). In one embodiment, each system database 412a-d is assigned one or more virtual PEs 408a-i. In the example shown in FIG. 4, virtual PE 408a is assigned to system database 412a as indicated by the dashed box enclosing that item. Further, virtual PEs 408b and 408c are assigned to system database 412b, virtual PEs 408e and 408f are assigned to system database 412c, and virtual PEs 408g, 408h, and 408i are assigned to system database 412d. Virtual PE 408d is not assigned to any system database and is being held "in reserve." In one embodiment, hash maps 414a-d identify which system database and AMP 410a-h is to receive a message directed to one of the system databases 412a-d. For example, if a message is directed to system database 412a, the virtual PE 408a that is assigned to system database 412a will use hash map 414a to determine if the message is to be delivered to AMP 410a or AMP 410b. Some of the AMPs in FIG. 4, such as AMP 410c, are represented as overlapping circles, indicating that AMP 410c is a plurality of AMPs. Generally, in one embodiment, the groups 412a-d can contain any number of AMPs. Each system database 412a-d includes a replication service group ("RSG") 416 that coordinates applying changes made to data in one system database to the same data replicated in another system database.

In multi-database systems, such as the system shown in FIG. 4 and such as that described in co-pending U.S. patent application Ser. No. 11/985,910, entitled "Dynamic Query and Step Routing Between Systems Tuned for Different Objectives," filed Nov. 19, 2007, incorporated by reference, new opportunities may arise for query execution when various conditions occur along the normal query path. In one embodiment, the optimizer recognizes conditions that impact the desirability of continuing with the existing query path and allows redirection to another query path.

Figure 5:
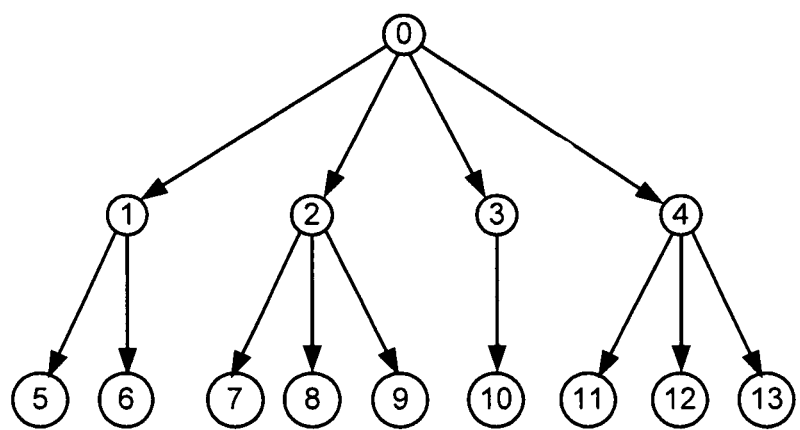
FIG. 5 illustrates alternative query paths.

For example, the optimizer may identify four initial alternative query paths, as shown in FIG. 5. In FIG. 5, the query path begins at node 0 and can follow one of four alternative paths: (1) to node 1, (2) to node 2, (3) to node 3, or (4) to node 4. Such a multiplicity of query paths is especially possible in multi-database systems such as that shown in FIG. 4. For example, referring to FIG. 4, the query path for node 1 may be for system database 412a to perform the first step. The query path for node 2 may be for system database 412b to perform the first step. The query path for node 3 may be for system database 412a and system database 412b to each perform a share of the first step. The query path for node 4 may be for all of system databases 412a, 412b, 412c, and 412d to each perform a share of the first step.

The query path may follow one of two alternative paths out of node 1: (1) to node 5, and (2) to node 6. The query path may follow one of three alternative paths out of node 2: (1) to node 7, (2) to node 8, and (3) to node 9. The query path has only a single path out of node 3, which is to node 10. The query path may follow one of three alternative paths out of node 4: (1) to node 11, (2) to node 12, and (3) to node 13. It will be recognized that the alternative query plans illustrated in FIG. 5 are merely an example and can be simpler or much more complicated. For example, the number of levels can be increased from three (including the level that includes only the starting node 0) to an arbitrary number.

In one embodiment, the optimizer 320 identifies alternative plan branches at the time of initial optimization. In other words, in this embodiment, the optimizer 320 identifies all alternative query paths (e.g., all nodes in FIG. 5) at the beginning of optimization.

In one embodiment, the optimizer 320 identifies alternative plan branches at the time of query rewrite and re-optimization after each execution step. In other words, in this embodiment, the optimizer 320 identifies the next level of alternatives as it moves from one level to another. For example, at the beginning of optimization, the optimizer 320 would identify the second layer of alternatives (i.e., nodes 1, 2, 3, and 4) but not all of the nodes in the layers below. After selecting and executing the selected plan branch from the first layer (e.g., node 2), the optimizer 320 identifies the next level of alternatives (i.e., nodes 7, 8, and 9).

In one embodiment, the optimizer performs a hybrid look-ahead optimization that looks one or more steps ahead in the query path and considers at the end of every step in the query plan whether a) to follow the existing query path, b) to follow another branch in pre-identified alternative query paths, or c) to re-plan the entire query plan at the end of each step.

The decision as to whether to change to an alternative plan at each step is made based on feedback. The feedback includes:

Workload definition (hereinafter "WD") throttles;
Overconsumption (e.g. of a CPU or I/O or memory) by a WD;
Surges in concurrency or arrival rate;
System CPU or I/O busy (Wait I/O) or high utilization;
AMPs, PEs, or GTWs down;
Data object inaccessible;
System down;
Unexpectedly high node skew;
Demographics do not match prediction based on statistics or heuristics;
Flow control;
AMP congestion (e.g., low AMP worker tasks);
other similar feedback.

Figure 6:
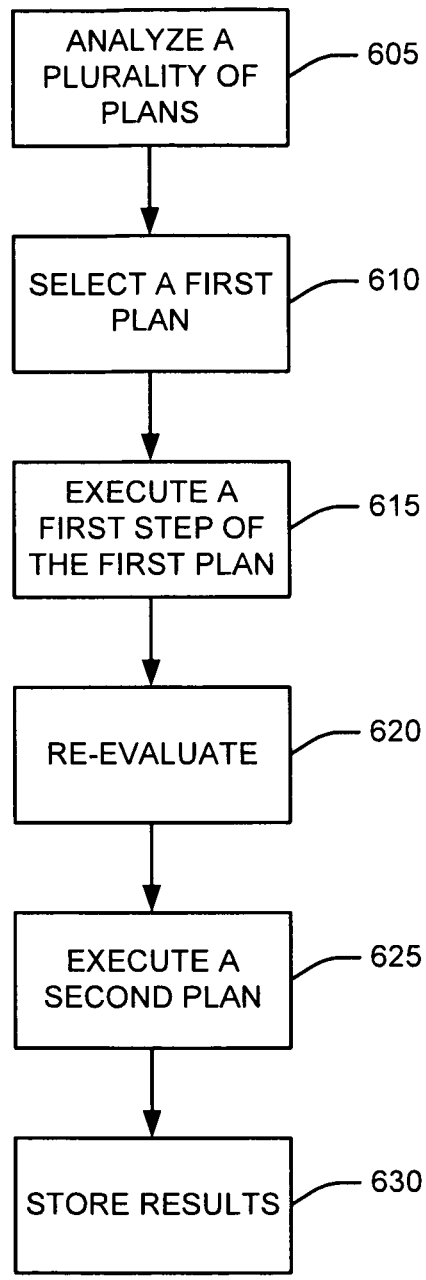
FIG. 6 is a flow chart of an optimization technique.

In operation, in one embodiment illustrated in FIG. 6, the system analyzes a plurality of plans for executing the query (block 605). The system selects a first plan having a first step and a second step (block 610). The system executes the first step of the first plan (block 615). The system re-evaluates the plan selection before executing the second step of the first plan (block 620). The system executes a second plan of the plurality of plans for executing the query to produce a result (block 625). The system stores the result in, for example, a computer memory (block 630).

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method comprising:
    evaluating a plurality of plans for executing a query on a multi-database system, the plurality of plans including a first plan and a second plan different from the first plan, and, as a result of evaluating, selecting a first plan, the first plan having a first step and a second step, the second plan having a first step and a second step, the first step of the first plan being the same as the first step of the second plan, and the second step of the first plan being different from the second step of the second plan;
    executing the first step of the first plan, after evaluating the plurality of plans and selecting the first plan;
    re-evaluating the plan selection after executing the first step of the first plan but before executing the second step of the first plan and, as a result of re-evaluating, selecting the second plan to continue executing the query;
    executing a second step of the second plan to produce a result; and
    storing the result.

2. The method of claim 1 wherein selecting the first plan comprises:
    selecting the one of the plurality of plans that has the least cost.

3. The method of claim 1 wherein:
    the second plan has a first step and a second step; and
    executing the second plan comprises executing the first step of the second plan and the second step of the second plan.

4. The method of claim 1 further comprising:
    determining that the first plan is no longer viable; and, in response selecting the second plan to execute the query.

5. The method of claim 4 wherein determining that the first plan is no longer viable comprises:
    determining that a system resource necessary to perform the first plan has malfunctioned.

6. The method of claim 4 wherein determining that the first plan is no longer viable comprises:
    determining that a system resource necessary to perform the first plan has become busy.

7. A multi-database system comprising:
    one or more nodes;
    a plurality of CPUs, each of the one or more nodes providing access to one or more CPUs;
    a plurality of virtual processes, each of the one or more CPUs providing access to one or more virtual processes;
    each virtual process configured to manage data, including rows from the set of database table rows, stored in one of a plurality of data-storage facilities;
    a process for:
    evaluating a plurality of plans for executing a query on a multi-database system, the plurality of plans including a first plan and a second plan different from the first plan, and, as a result of evaluating, selecting a first plan, the first plan having a first step and a second step, the second plan having a first step and a second step, the first step of the first plan being the same as the first step of the second plan, and the second step of the first plan being different from the second step of the second plan;
    executing the first step of the first plan, after evaluating the plurality of plans and selecting the first plan;
    re-evaluating the plan selection after executing the first step of the first plan but before executing the second step of the first plan and, as a result of re-evaluating, selecting the second plan to continue executing the query;
    executing a second step of the second plan to produce a result; and
    storing the result.

8. The database system of claim 7 wherein selecting the first plan comprises:
    selecting the one of the plurality of plans that has the least cost.

9. The database system of claim 7 wherein:
    the second plan has a first step and a second step; and
    executing the second plan comprises executing the first step of the second plan and the second step of the second plan.

10. The database system of claim 7, the process further comprising:
    determining that the first plan is no longer viable; and, in response selecting the second plan to execute the query.

11. The database system of claim 10 wherein determining that the first plan is no longer viable comprises:
   determining that a system resource necessary to perform the first plan has malfunctioned.

12. The database system of claim 10 wherein determining that the first plan is no longer viable comprises:
   determining that a system resource necessary to perform the first plan has become busy.

13. A computer program, stored in a non-transitory computer-readable tangible medium, for optimizing execution of a query, the program comprising executable instructions that cause a computer to:
   evaluate a plurality of plans for executing a query on a multi-database system, the plurality of plans including a first plan and a second plan different from the first plan, and, as a result, select a first plan, the first plan having a first step and a second step, the second plan having a first step and a second step, the first step of the first plan being the same as the first step of the second plan, and the second step of the first plan being different from the second step of the second plan;
   execute the first step of the first plan, after evaluating the plurality of plans and selecting the first plan;
   re-evaluate the plan selection after executing the first step of the first plan but before executing the second step of the first plan and, as a result of, selecting a second plan to continue executing the query;
   execute a second step of the second plan to produce a result; and
   store the result.

14. The computer program of claim 13 wherein, when selecting the first plan, the computer: selects the one of the plurality of plans that has the least cost.

15. The computer program of claim 13 wherein:
   the second plan has a first step and a second step; and
   executing the second plan comprises executing the first step of the second plan and the second step of the second plan.

16. The computer program of claim 13 further comprising executable instructions that cause the computer to:
   determine that the first plan is no longer viable; and, in response select the second plan to execute the query.

17. The computer program of claim 16 wherein, when determining that the first plan is no longer viable, the computer:
   determines that a system resource necessary to perform the first plan has malfunctioned.

18. The computer program of claim 16 wherein, when determining that the first plan is no longer viable, the computer:
   determines that a system resource necessary to perform the first plan has become busy.

* * * * *